(12) United States Patent
Henderson et al.

(10) Patent No.: US 8,260,534 B2
(45) Date of Patent: Sep. 4, 2012

(54) VEHICLE OCCUPANT INFORMATION SYSTEM FOR DETERMINING OBTAINABLE TRAVEL DISTANCES

(75) Inventors: Chris Henderson, Belleville, MI (US); Daryl Smith, Howell, MI (US)

(73) Assignee: Nissan North America, Inc., Franklin, TN (US)

( * ) Notice: Subject to any disclaimer, the term of this patent is extended or adjusted under 35 U.S.C. 154(b) by 354 days.

(21) Appl. No.: 12/701,638

(22) Filed: Feb. 8, 2010

(65) Prior Publication Data
US 2011/0196600 A1 Aug. 11, 2011

(51) Int. Cl.
*G01F 9/00* (2006.01)
(52) U.S. Cl. .................. 701/123; 73/114.53; 73/114.54; 340/439
(58) Field of Classification Search ................... 701/123; 73/114.54
See application file for complete search history.

(56) References Cited

U.S. PATENT DOCUMENTS

| | | | |
|---|---|---|---|
| 3,589,176 A * | 6/1971 | Wellons | 73/114.54 |
| 4,046,998 A | 9/1977 | Kuno et al. | |
| 4,157,030 A | 6/1979 | Keely | |
| 4,217,644 A | 8/1980 | Kato et al. | |
| 4,400,779 A | 8/1983 | Kosuge et al. | |
| 5,301,113 A | 4/1994 | To et al. | |
| 5,539,399 A * | 7/1996 | Takahira et al. | 340/995.27 |
| 5,916,298 A * | 6/1999 | Kroiss et al. | 701/123 |
| 6,467,337 B2 | 10/2002 | Sadahiro et al. | |
| 6,961,656 B2 * | 11/2005 | Kim | 701/123 |
| 7,219,539 B1 * | 5/2007 | Bauerle | 73/114.54 |
| 2002/0032540 A1 * | 3/2002 | Sadahiro et al. | 702/149 |

FOREIGN PATENT DOCUMENTS
KR 100828796 * 5/2008
* cited by examiner

*Primary Examiner* — Thomas Black
*Assistant Examiner* — Lindsay M Browder
(74) *Attorney, Agent, or Firm* — Global IP Counselors, LLP

(57) ABSTRACT

A vehicle occupant information controller includes a fuel volume determining section, a fuel economy determining section, a first distance determining section, a traveled distance determining section and a second distance determining section. The first distance determining section determines a first obtainable travel distance based on a remaining fuel volume from the fuel volume determining section and a fuel consumption rate from the fuel economy determining section. The traveled distance determining section determines a vehicle traveled distance between two locations. The second distance determining section determines a second obtainable travel distance based on a difference between a previous obtainable travel distance value and an adjusted vehicle traveled distance value, with the adjusted vehicle traveled distance value being equal to a product of the vehicle traveled distance and a distance adjustment factor that is selectively adjusted based on a ratio of the second obtainable travel distance to the first obtainable travel distance.

19 Claims, 12 Drawing Sheets

VEHICLE OCCUPANT INFORMATION SYSTEM FOR DETERMINING OBTAINABLE TRAVEL DISTANCES

BACKGROUND

1. Field of the Invention

The present invention generally relates to a vehicle occupant information system. More specifically, the present invention relates to a vehicle occupant information system that displays a distance-to-empty (DTE) reading.

2. Background Information

Vehicles are increasingly providing useful data to drivers such as a distance-to-empty (DTE) reading. A DTE value is defined as simply an estimated distance that a vehicle can travel before running out of fuel. Typically, the DTE value is determined based on the current volume of fuel in the fuel tank as well as the fuel economy of the vehicle. The volume of fuel remaining in the fuel tank is typically measured by a floating sensor. Fuel economy is typically either a fixed value for a vehicle or determined based on fuel consumption during a recent period of time or distance of travel. One example of a vehicle information system is disclosed in U.S. Pat. No. 4,046,998, in which a vehicle information system determines an amount of fuel consumed during a specific time period based on a quantity of fuel processed by a fuel injection system, and then outputs a distance-to-empty value that was determined based on a current driving condition. Some other examples of vehicle information systems that output DTE readings are disclosed in the following U.S. publications: U.S. Pat. No. 4,157,030; U.S. Pat. No. 4,217,644; U.S. Pat. No. 4,400,779; U.S. Pat. No. 5,301,113; and U.S. Pat. No. 6,467,337.

SUMMARY

It has been discovered that with conventional vehicle technology driving habits and/or driving conditions can contribute to fluctuations in fuel economy. In many prior vehicle information systems, these fluctuations in fuel economy can result in the DTE value going up and/or down quicker proportionally than a rate at which the vehicle is traveling. This situation may be confusing for some drivers.

In view of the state of known technology, one aspect of the present invention is to provide a vehicle occupant information controller that mainly comprises a fuel volume determining section, a fuel economy determining section, a first distance determining section, a traveled distance determining section and a second distance determining section. The fuel volume determining section determines a remaining fuel volume. The fuel economy determining section determines a fuel consumption rate. The first distance determining section determines a first obtainable travel distance based on the remaining fuel volume and the fuel consumption rate. The traveled distance determining section determines a vehicle traveled distance from a first location to a second subsequent location. The second distance determining section determines a second obtainable travel distance based on a difference between a previous obtainable travel distance value corresponding to the first location and an adjusted vehicle traveled distance value, with the adjusted vehicle traveled distance value being equal to a product of the vehicle traveled distance and a distance adjustment factor that is selectively adjusted based on a ratio of the second obtainable travel distance to the first obtainable travel distance.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
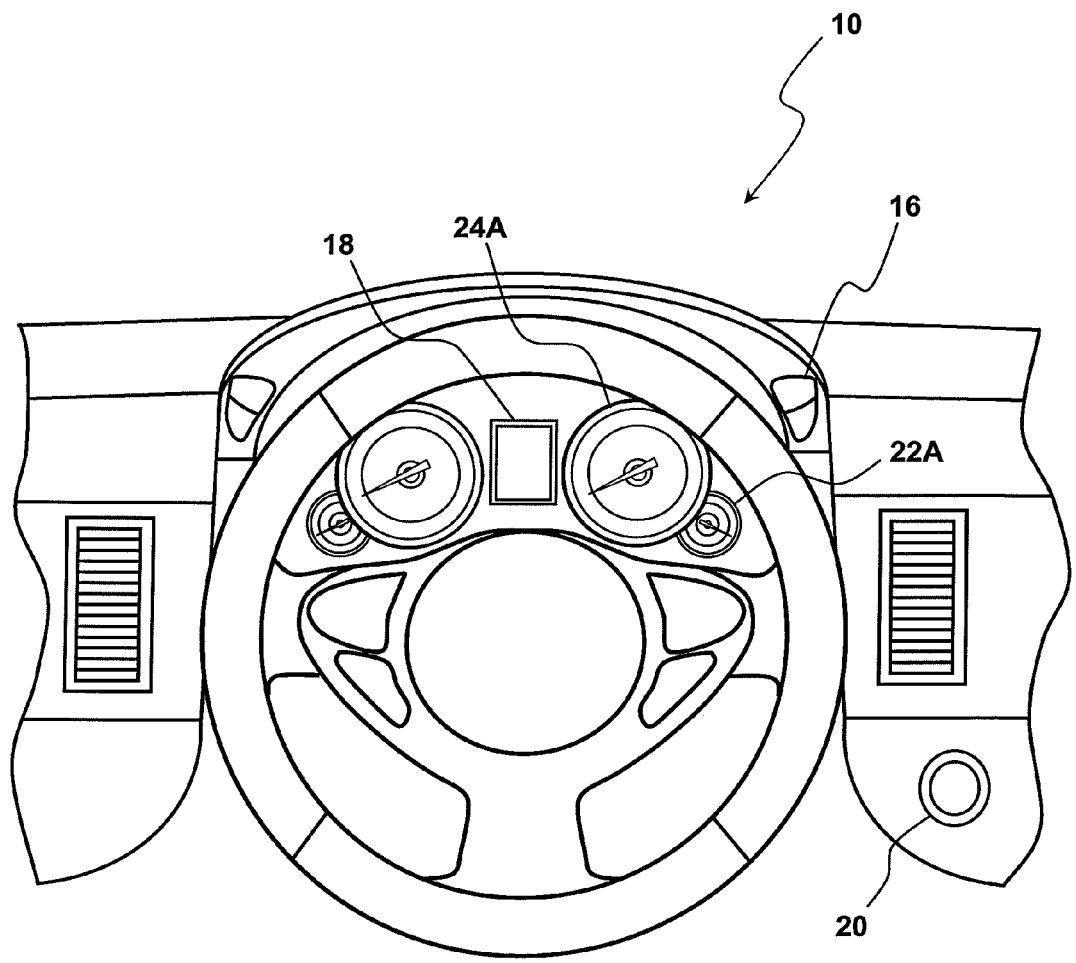
FIG. 1 is an interior view of a portion of a vehicle that is equipped with a vehicle occupant information system in accordance with an illustrated embodiment.
Figure 2:
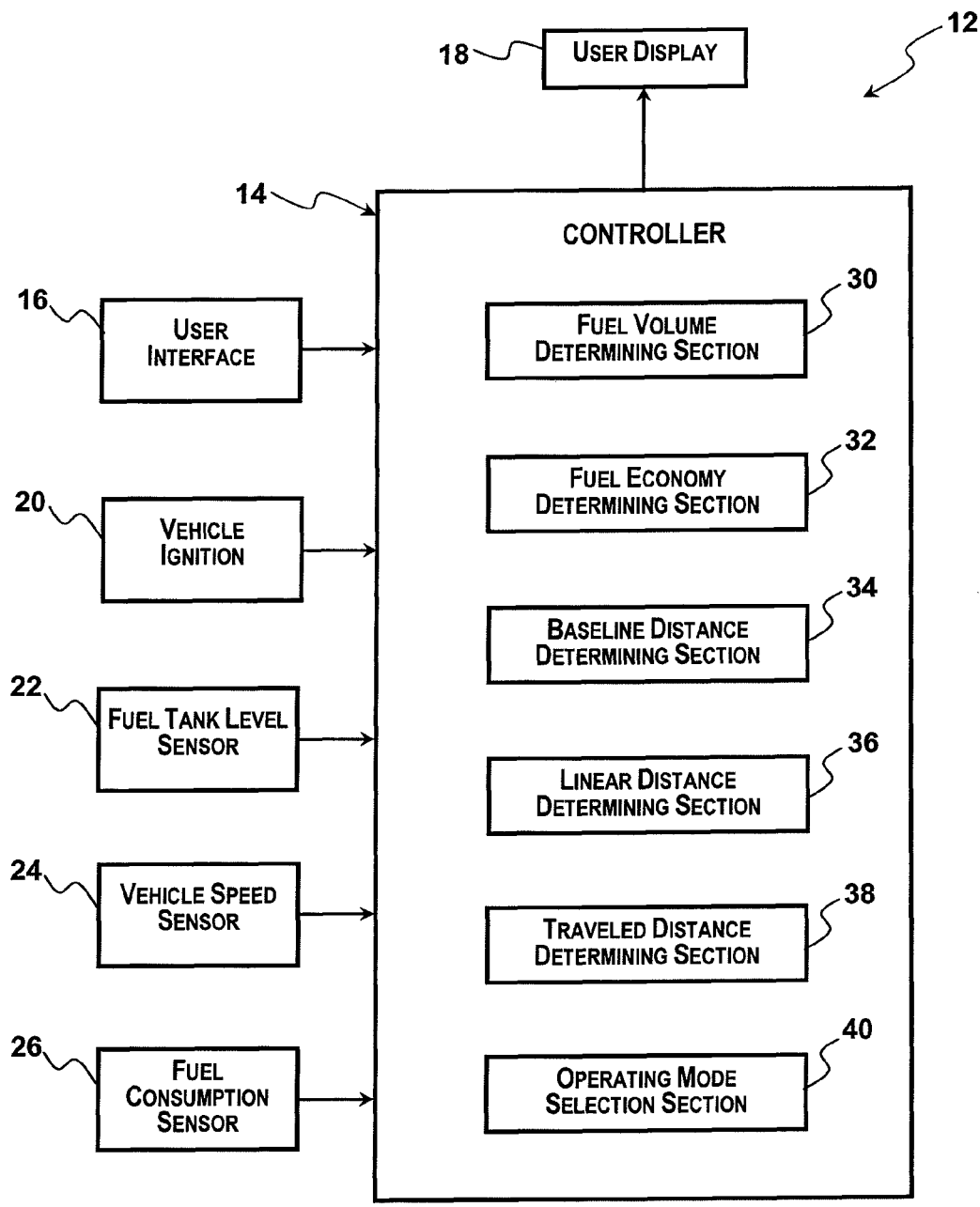
FIG. 2 is a high-level block diagram of the vehicle occupant information system that includes among other things a vehicle occupant information controller, a user interface, a user display and various sensors.

Referring initially to FIG. 1, a portion of a vehicle 10 is illustrated that displays a distance-to-empty (DTE) reading in accordance with one embodiment. An estimated DTE value is an estimated distance that the vehicle 10 can travel before running out of fuel. As seen in FIG. 2, a vehicle occupant information system 12 for the vehicle 10 is diagrammatically illustrated in accordance with the illustrated embodiment. The vehicle occupant information system 12 mainly includes a vehicle occupant information controller 14, a user interface 16, a user display 18, a vehicle ignition 20, a fuel tank level sensor 22, a vehicle speed sensor 24 and a fuel consumption sensor 26. However, the vehicle occupant information system 12 also preferably receives other signals such as a transmission shift position signal PRNDL and a parking brake switch signal PKB through a controller area network (CAN).

The vehicle occupant information controller 14 is operatively connected to the vehicle ignition 20 such that the vehicle ignition 20 enables operation of the vehicle occupant information controller 14. In other words, when the vehicle ignition 20 is turned to an "ON" position or an "accessory"

position, electrical power from a battery (not shown) is supplied to the vehicle occupant information controller 14. Once the vehicle occupant information controller 14 is activated, the vehicle occupant information controller 14 selectively receives signals from the user interface 16, the fuel tank level sensor 22, the vehicle speed sensor 24 and the fuel consumption sensor 26.

The fuel tank level sensor 22 constitutes a fuel sensor that detects a remaining fuel volume of the vehicle's fuel tank. One example of the fuel tank level sensor 22 is a float-type sensor that detects the fuel level of the fuel tank of the vehicle 10. The fuel tank level sensor 22 generates a remaining fuel volume signal TANK_VOL indicative of the remaining fuel tank volume, and sends the remaining fuel tank volume signal to the vehicle occupant information controller 14 via an engine control module (ECM) through the controller area network (CAN). The remaining fuel volume in the fuel tank as measured by the fuel tank level sensor 22 is displayed by a fuel gauge 22A on the vehicle's dashboard as seen in FIG. 1.

The vehicle speed sensor 24 detects a vehicle speed of the vehicle 10. One example of the vehicle speed sensor 24 is a wheel-rotation-type sensor that detects the number of rotations of a wheel of the vehicle 10. The vehicle speed sensor 24 generates a vehicle speed signal VSP indicative of the vehicle speed, and sends the vehicle speed signal to the vehicle occupant information controller 14. The vehicle speed as measured by the vehicle speed sensor 24 is displayed by a speed gauge 24A on the vehicle's dashboard as seen in FIG. 1.

The fuel consumption sensor 26 detects a consumed fuel volume by a fuel injection system of the vehicle 10. One example of the fuel consumption sensor 26 is a fuel injection amount sensor that detects the amount of fuel being injected into the cylinders by the fuel injection system of the vehicle 10. The fuel consumption sensor 26 generates a fuel consumption signal TIM_VOL indicative of the consumed fuel volume, and sends the fuel consumption signal to the vehicle occupant information controller 14.

As explained below, the vehicle occupant information controller 14 executes a distance-to-empty (DTE) program provided with an algorithm that generates an estimated distance-to-empty (DTE) value. The estimated DTE value is displayed to the driver through the user display 18. The estimated DTE value is an estimate that indicates to the driver how far the vehicle 10 can be driven before running out of fuel. As explained below, the estimated DTE value provides a more accurate appraisal of the fuel level to the driver by the vehicle occupant information controller 14 taking into consideration available information to increase the overall accuracy of the estimated DTE value. While the vehicle occupant information controller 14 is only illustrated as executing the distance-to-empty (DTE) program, it will be apparent to those skilled in the art that the vehicle occupant information controller 14 can and most likely would be used for executing other programs that provide information to occupants such as fuel economy, fuel tank level, distance traveled, etc.

Generally, the vehicle occupant information controller 14 preferably includes a microcomputer with a distance-to-empty (DTE) display program that displays the estimated DTE value on the user display 18. The vehicle occupant information controller 14 also includes other conventional components such as an input interface circuit, an output interface circuit, and storage devices such as a ROM (Read Only Memory) device and a RAM (Random Access Memory) device. It will be apparent to those skilled in the art from this disclosure that the precise structure and algorithms of the vehicle occupant information controller 14 can be any combination of hardware and software that will carry out the function of displaying the estimated DTE value on the user display 18.

The user interface 16 is operatively connected to the vehicle occupant information controller 14 for controlling and/or setting various features of the vehicle occupant information system 12. Basically, the user interface 16 includes one or more user inputs for controlling and/or setting the various features of the vehicle occupant information system 12. For example, in the illustrated embodiment, as seen in FIG. 1, the user interface 16 has two input buttons for controlling and/or setting the various features of the vehicle occupant information system 12. Of course, it will be apparent to those skilled in the art from this disclosure that other types of user inputs can be used such as, but not limited to, voice recognition hardware and/or software. The user interface 16 is a conventional component that is well known in the art. Since user interfaces are well known in the art, the precise structures of the user interface 16 will not be discussed or illustrated in detail herein. Rather, it will be apparent to those skilled in the art from this disclosure that the user interface 16 can be any type of structure and/or programming that can be used to carry out the functions of the vehicle occupant information system 12 as needed and/or desired.

In the illustrated embodiment, the user interface 16 includes an operating mode selection feature that allows the driver to manually select the operating mode of the vehicle occupant information controller 14. For example, in the illustrated embodiment, the operating mode selection feature allows the driver to manually select between two or more geographical region operating modes. The geographical region operating modes are based on geographical locations of the vehicle 10. In other words, geographical region modes correspond to different geographical locations such that the estimated DTE value displayed on the user display 18 is different for each of the geographical region operating modes. For example, the estimated DTE value displayed on the user display 18 will be calculated differently while operating with a first geographical region operating mode (e.g. Japan) selected than when operating with a second geographical region operating mode (e.g. the United States) selected. For example, the vehicle occupant information system 12 can be set to act linearly in some markets (e.g., a first geographical region R1) where this meets customer expectations, and allowed to both increase and decrease in other markets (e.g., a second geographical region R2) where this is not a significant concern. Alternatively, since the geographical region operating modes are based on a geographical location of the vehicle 10, the vehicle occupant information controller 14 can automatically set the geographical region operating modes using a GPS signal, a mapping information signal, or the like.

Figure 3:
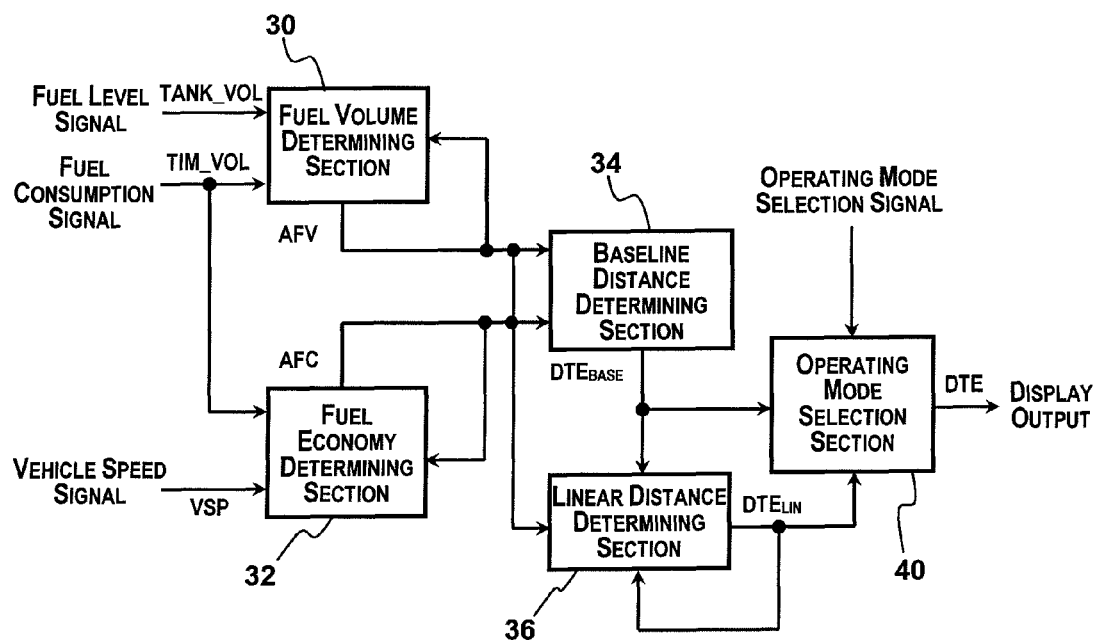
FIG. 3 is a functional block diagram of the vehicle occupant information system to illustrate computation of a distance-to-empty (DTE) value.

As seen in FIGS. 2 and 3, in this illustrated embodiment, the vehicle occupant information controller 14 mainly includes a fuel volume determining section 30, a fuel economy determining section 32, a first or baseline distance determining section 34, a second or linear distance determining section 36, a traveled distance determining section 38 and an operating mode selection section 40.

Figure 4A:
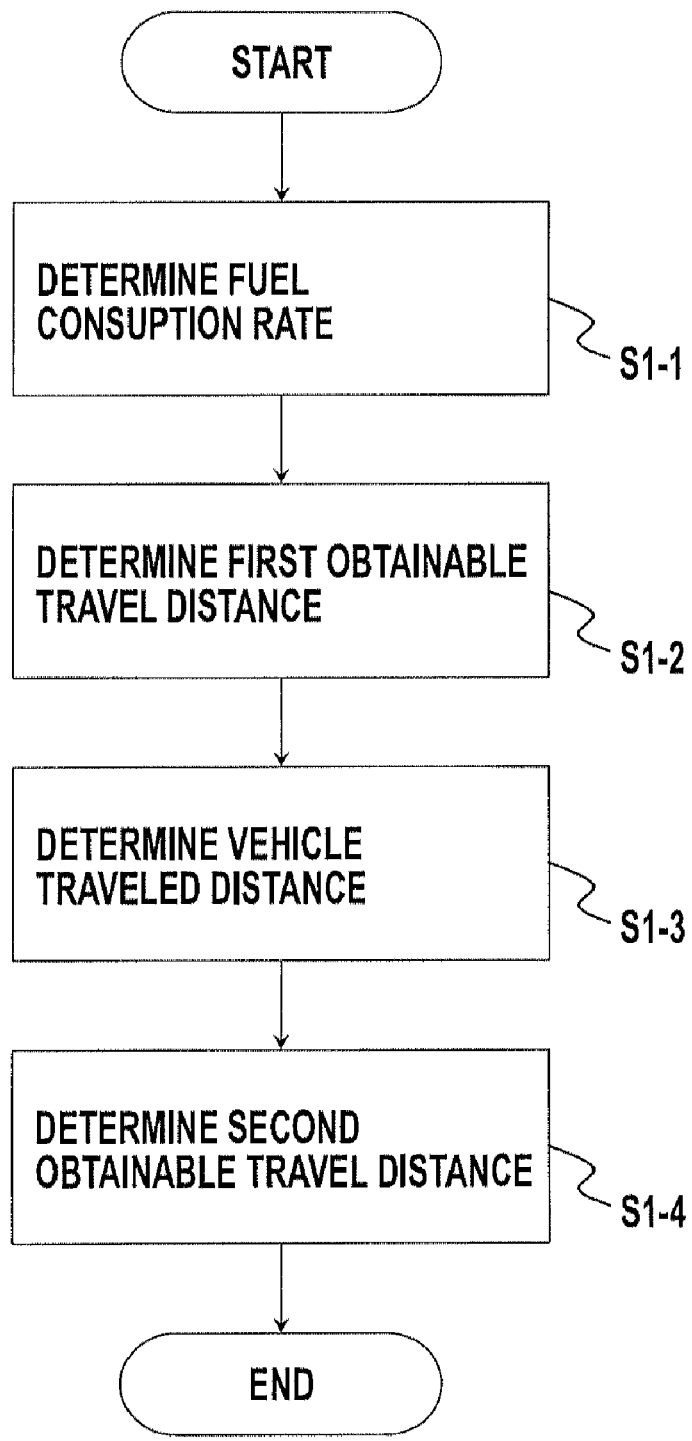
FIG. 4A is a flowchart illustrating a process executed by the vehicle occupant information controller to determine an obtainable travel distance for the vehicle.

Generally speaking, the fuel volume determining section 30 determines a remaining fuel volume AFV based on the remaining fuel volume signal TANK_VOL from the fuel tank level sensor 22 and the fuel consumption signal TIM_VOL from the fuel consumption sensor 26. As will now be discussed with regard to FIGS. 4A and 4B, the fuel economy determining section 32 generally determines a fuel economy or fuel consumption rate AFC based on the vehicle speed signals VSP from the vehicle speed sensor 24 and the fuel consumption signal TIM_VOL from the fuel consumption sensor 26 in step S1-1 of FIG. 4A. A first or base obtainable travel distance $DTE_{BASE}$ and a second or linear obtainable travel distance $DTE_{LIN}$ are then determined and used to determine the distance adjustment factor $DTE_{ADJ}$. More specifically, the baseline distance determining section 34 determines a first or base obtainable travel distance $DTE_{BASE}$ based on a value of the remaining fuel volume and a value of the fuel consumption rate in step S1-2 of FIG. 4A. In step S1-3, the traveled distance determining section 38 determines a vehicle traveled distance DIST from a first location to a second subsequent location using the vehicle speed sensor 24. The linear distance determining section 36 determines a second or linear obtainable travel distance $DTE_{LIN}$ based on a difference between an immediately previous linear obtainable travel distance value $PREV\_DTE_{LIN}$ and an adjusted vehicle traveled distance value DTE_DIST in step S1-4. The adjusted vehicle traveled distance value DTE_DIST is equal to a product of the vehicle traveled distance since the last calculation and a distance adjustment factor $DTE_{ADJ}$, with the distance adjustment factor $DTE_{ADJ}$ being selectively adjusted based on a ratio of the linear obtainable travel distance $DTE_{LIN}$ to the base obtainable travel distance $DTE_{BASE}$. Data from the fuel consumption sensor 26 is used in addition to the data from the fuel tank level sensor 22 to improve the prediction or estimate of fuel usage for estimating the linear obtainable travel distance $DTE_{LIN}$. The operating mode selection section 40 receives both the baseline obtainable travel distance $DTE_{BASE}$ and the linear obtainable travel distance $DTE_{LIN}$. Then the operating mode selection section 40 selectively outputs one of the baseline obtainable travel distance $DTE_{BASE}$ and the linear obtainable travel distance $DTE_{LIN}$ based on the geographical region operating mode of the vehicle occupant information controller 14.

In this illustrated embodiment, after the vehicle ignition 20 is turned to the "ON" position to start the engine, the vehicle occupant information controller 14 starts a calculation update timer that signals the vehicle occupant information controller 14 to calculate the remaining fuel volume AFV, the fuel consumption rate AFC, the baseline obtainable travel distance $DTE_{BASE}$ and the linear obtainable travel distance $DTE_{LIN}$ in prescribed intervals corresponding to a prescribed calculation update time Tcal that is recorded by a Tcal timer. In the illustrated embodiment, the prescribed calculation update time Tcal is set to thirty seconds such that the remaining fuel volume AFV, the fuel consumption rate AFC, the baseline obtainable travel distance $DTE_{BASE}$ and the linear obtainable travel distance $DTE_{LIN}$ are calculated every thirty seconds while the engine of the vehicle 10 is running. The Tcal timer continues to run so long as the engine is running (e.g., greater than 170 rpm). If the engine stops running (e.g., less than or equal to 170 rpm), the current value of the Tcal timer is saved and the Tcal timer resumes once the engine begins to run (e.g., greater than 170 rpm) again. Whenever the vehicle ignition 20 is turned to the "ON" position and normal refueling is detected, the data values tracked by the vehicle occupant information controller 14 are updated. After updating the data, normal operation according to the prescribed calculation update time Tcal resumes. Also, if a fast-fill situation is detected after the vehicle ignition 20 is turned to the "ON" position, the vehicle occupant information controller 14 proceeds normally according to the prescribed calculation update time Tcal.

Basically, the baseline distance determining section 34 determines the first or base obtainable travel distance $DTE_{BASE}$ based on a value of the remaining fuel volume AFV and a value of the fuel consumption rate AFC. In this embodiment, the first or base obtainable travel distance $DTE_{BASE}$ is also used for the first geographical region R1. More specifically, in the case of the first geographical region R1, the following equation (1) is executed every thirty seconds by the baseline distance determining section 34 to calculate the base obtainable travel distance $DTE_{BASE}$ in the illustrated embodiment.

$$DTE_{BASE}[\text{km}] = \frac{(AFV - DR - SM)}{AFC} \times 100 \qquad (1)$$

where:
   AFV [L]: Current average remaining fuel volume or amount;
   DR [L]: Immeasurable fuel volume (also called dead remain);
   SM [L]: Safety Margin (e.g., 1.0 Liter); and
   AFC [L/100 km]: Current average fuel consumption (economy) rate.

As can be determined from equation (1), the changes in the fuel consumption (economy) rate AFC cause the base obtainable travel distance $DTE_{BASE}$ to increase or decrease as the fuel consumption (economy) rate AFC increases or decreases. However, if the fuel economy rate during the last 1.0 km of travel is exactly equal to the value of the average fuel consumption (economy) rate AFC from the last calculation, then the base obtainable travel distance $DTE_{BASE}$ will be reduced by 1.0 km after driving 1.0 km. Otherwise, the base obtainable travel distance $DTE_{BASE}$ will change based on the fuel consumption (economy) rate AFC, not based on just the fuel economy rate during the last 1.0 km of travel. In any event, the change of the base obtainable travel distance $DTE_{BASE}$ is limited to about 3.0 km per 30 sec to reduce fluctuations from a prior value of the base obtainable travel distance $DTE_{BASE}$ to the next immediately subsequent value for the base obtainable travel distance $DTE_{BASE}$. In other words, if the absolute value of the difference between a current base obtainable travel distance value $CURR\_DTE_{BASE}$ and an immediately previous base obtainable travel distance value $PREV\_DTE_{BASE}$ is greater than 3.5 km, then the current base obtainable travel distance value $CURR\_DTE_{BASE}$ will be set to ±3.5 km from the immediately previous base obtainable travel distance value $PREV\_DTE_{BASE}$ depending on whether the base obtainable travel distance $DTE_{BASE}$ is increasing or decreasing.

Basically, the linear distance determining section 36 determines the second or linear obtainable travel distance $DTE_{LIN}$ based on a difference between an immediately previous linear obtainable travel distance value $PREV\_DTE_{LIN}$ and an adjusted vehicle traveled distance value DTE_DIST. The second obtainable travel distance $DTE_{LIN}$ is used for vehicles in the second geographical region R2. More specifically, in the case of the second geographical region R2, the following equation (2) is used to calculate the second obtainable travel distance $DTE_{LIN}$ in the illustrated embodiment.

$$DTE_{LIN}[\text{km}] = PREV\_DTE_{LIN} - DTE\_DIST \qquad (2)$$

where:
   $PREV\_DTE_{LIN}$ [km]: Previous calculated $DTE_{LIN}$ value; and
   DTE_DIST [km]: Adjusted distance traveled since the last calculated $DTE_{LIN}$.

In the calculation of the second obtainable travel distance $DTE_{LIN}$ using equation (2), the adjusted vehicle traveled distance value DTE_DIST is selectively adjusted using a distance adjustment factor $DTE_{ADJ}$ that is based on a ratio of the second obtainable travel distance $DTE_{LIN}$ to the first obtainable travel distance $DTE_{BASE}$. Preferably, the adjusted vehicle traveled distance value DTE_DIST is based on a change in the remaining fuel volume and the fuel consumption rate. In particular, in this illustrated embodiment, the adjusted vehicle traveled distance value DTE_DIST for reducing cruising distance is calculated using the following equation (3).

$$DTE\_DIST[km] = DTE_{ADJ} \times \frac{(PREV\_AFV - AFV)}{AFC} \times 100 \quad (3)$$

where:
- $DTE_{ADJ}$: Distance adjustment factor used for $DTE_{LIN}$ calculation;
- PREV_AFV [L]: Previous amount of remaining fuel;
- AFV [L]: Current average remaining fuel volume or amount; and
- AFC [L/100 km]: Current average fuel consumption (economy) rate.

In this calculation of the adjusted vehicle traveled distance value DTE_DIST, the changes in the fuel consumption (economy) rate AFC will cause the adjusted vehicle traveled distance value DTE_DIST to increase or decrease as the fuel consumption (economy) rate AFC increases or decreases. The adjusted vehicle traveled distance value DTE_DIST is subtracted from the previous calculated $DTE_{LIN}$ value. Thus, while the adjusted vehicle traveled distance value DTE_DIST may increase or decrease based on the changes in the fuel consumption (economy) rate AFC, the linear obtainable travel distance $DTE_{LIN}$ will only decrease. However, even if the fuel economy rate during the last 1.0 km of travel is exactly equal to the average fuel consumption (economy) rate AFC from the immediately previous calculation, the linear obtainable travel distance $DTE_{LIN}$ will still be reduced by 1.0 km after driving 1.0 km. Otherwise, the linear obtainable travel distance $DTE_{LIN}$ will change based on the fuel consumption (economy) rate AFC, as opposed to being based solely on the fuel economy rate during the last 1.0 km of travel.

Figure 4B:
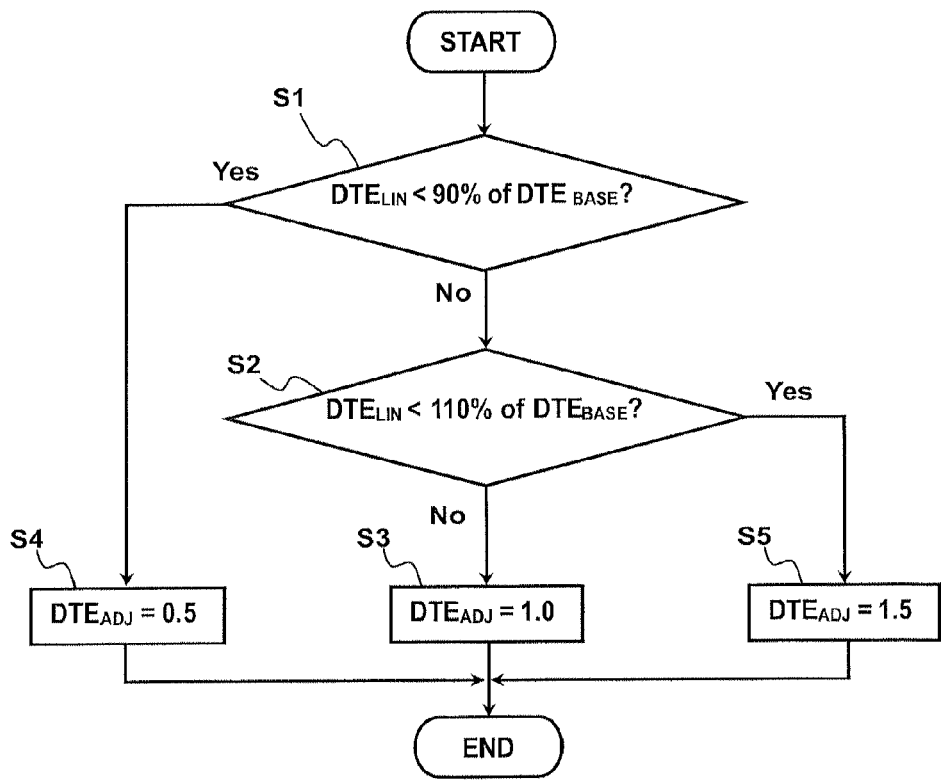
FIG. 4B is a flowchart illustrating a process executed by the vehicle occupant information controller to determine a DTE adjustment or correction factor used to compute a linear DTE value.

Referring to the flow chart of FIG. 4B, the determination of the distance adjustment factor $DTE_{ADJ}$ will now be explained in more detail. In this illustrated embodiment, the process of the flow chart of FIG. 4B is executed every thirty seconds (i.e., at the calculation update time Tcal) in conjunction with the calculation of the second obtainable travel distance $DTE_{LIN}$. It is worth noting that an additional advantage of the algorithm illustrated by the flow chart of FIG. 4B is that it is efficient and may be implemented in an existing system without significantly taxing available data processing resources. Moreover, the on-going process of monitoring vehicle information is simple in that no complicated calculations are required. The only complex calculations occur at set intervals that will not burden the microprocessor. Memory usage is also very low. There are no arrays or complicated histories that must be stored. Finally, this algorithm may utilize data values that are already generated by other conventional vehicle systems.

In step S1, the vehicle occupant information controller 14 compares the second or linear obtainable travel distance $DTE_{LIN}$ to the first or base obtainable travel distance $DTE_{BASE}$. In the illustrated embodiment, the vehicle occupant information controller 14 determines if the second or linear obtainable travel distance $DTE_{LIN}$ is greater than or equal to 90% of the first or base obtainable travel distance $DTE_{BASE}$ (i.e., $DTE_{LIN}$<90% of $DTE_{BASE}$). If the second or linear obtainable travel distance $DTE_{LIN}$ is greater than or equal to 90% of the first or base obtainable travel distance $DTE_{BASE}$, then the process proceeds to step S2.

In step S2, the vehicle occupant information controller 14 determines if $DTE_{LIN}$<110% of $DTE_{BASE}$. If the second or linear obtainable travel distance $DTE_{LIN}$ is greater than or equal to 110% of the first or base obtainable travel distance $DTE_{BASE}$, then the process proceeds to step S3.

In step S3, the vehicle occupant information controller 14 sets the distance adjustment factor $DTE_{ADJ}$ to 1.0 (i.e., $DTE_{ADJ}$=1.0). In other words, when the second or linear obtainable travel distance $DTE_{LIN}$ falls within 10% of the first or base obtainable travel distance $DTE_{BASE}$, no adjustment is made to the vehicle traveled distance DIST that the vehicle 10 has traveled since the last calculation of the second or linear obtainable travel distance $DTE_{LIN}$. Once the distance adjustment factor $DTE_{ADJ}$ has been set, the process ends until the next prescribed interval (e.g., Tcal=30 seconds).

However, in step S1, if the second or linear obtainable travel distance $DTE_{LIN}$ is less than 90% of the $DTE_{BASE}$, then the process proceeds to step S4. In step S4, the vehicle occupant information controller 14 sets the distance adjustment factor $DTE_{ADJ}$ to 0.5 (i.e., $DTE_{ADJ}$=0.5). In other words, when a ratio of the second or linear obtainable travel distance $DTE_{LIN}$ to the first or base obtainable travel distance $DTE_{BASE}$ is less than 0.9, then the vehicle traveled distance DIST is adjusted to a smaller value by the distance adjustment factor $DTE_{ADJ}$.

However, in step S2, if the second or linear obtainable travel distance $DTE_{LIN}$ is less than 110% of the first or base obtainable travel distance $DTE_{BASE}$, then the process proceeds to step S5. In step S5, the vehicle occupant information controller 14 sets the distance adjustment factor $DTE_{ADJ}$ to 1.5 (i.e., $DTE_{ADJ}$=1.5). In other words, when a ratio of the second or linear obtainable travel distance $DTE_{LIN}$ to the first or base obtainable travel distance $DTE_{BASE}$ is less than 1.1, then the vehicle traveled distance DIST is adjusted to a larger value by the distance adjustment factor $DTE_{ADJ}$.

Thus, as seen from FIG. 4B, the linear distance determining section 36 decreases the adjusted vehicle traveled distance value DTE_DIST when a ratio of the second obtainable travel distance to the first obtainable travel distance is less than a first predetermined value (e.g., 0.9). The linear distance determining section 36 increases the adjusted vehicle traveled distance value DTE_DIST when a ratio of the second obtainable travel distance to the first obtainable travel distance exceeds the first predetermined value (e.g., 0.9) and is less than a second predetermined value (e.g., 1.1).

Figure 5:
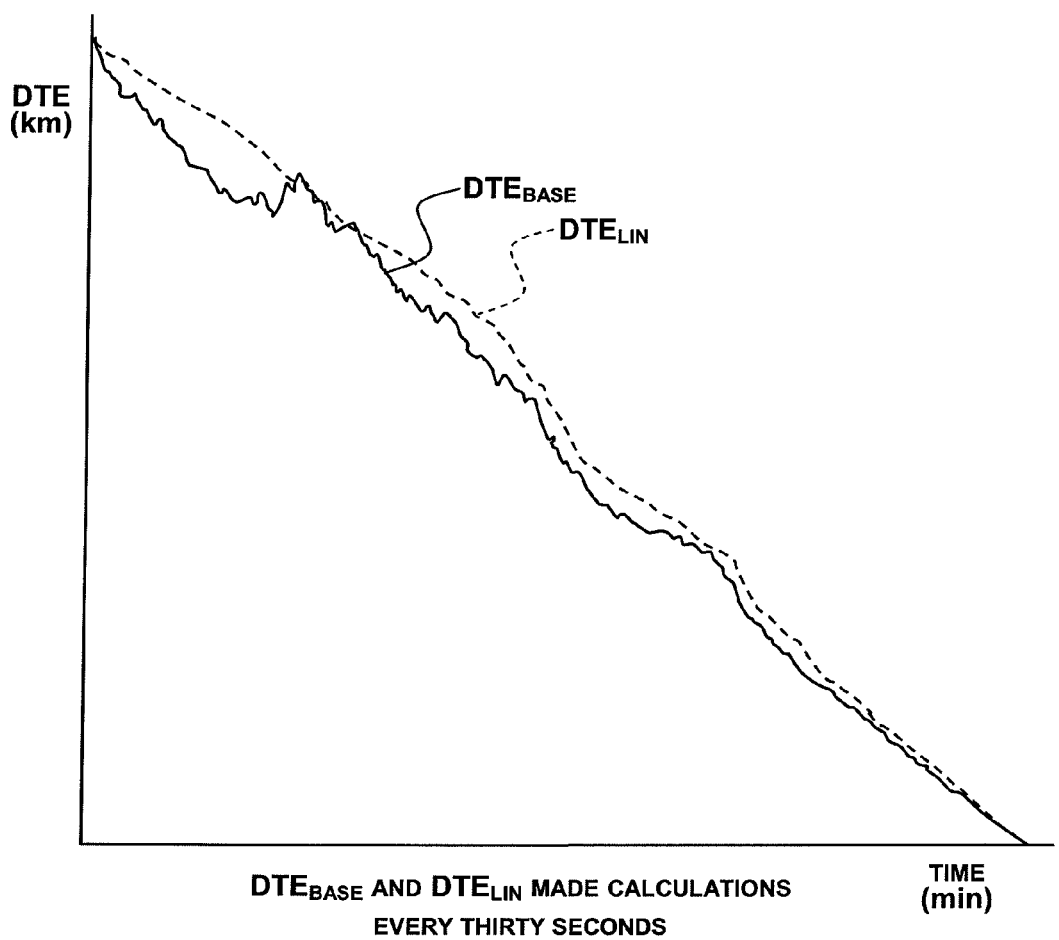
FIG. 5 is a graph showing an exemplary data set for both a baseline DTE value and a linear DTE value as a function of time according to the algorithm of the vehicle occupant information controller.

As seen in FIG. 5, a graph illustrates $DTE_{BASE}$ values and $DTE_{LIN}$ values as a function of time for an exemplary data set according to the equations (1) and (2) of the vehicle occupant information controller 14. By using the distance adjustment factor $DTE_{ADJ}$ in equation (3), the adjusted vehicle traveled distance value DTE_DIST can be calculated so that the values of the linear obtainable travel distance $DTE_{LIN}$ become more linear as a function of time as compared to the values of the baseline obtainable travel distance $DTE_{BASE}$. In other words, in this illustrated embodiment, the values of the linear obtainable travel distance $DTE_{LIN}$ decrease in a more linear manner over time as compared to the values of the baseline obtainable travel distance $DTE_{BASE}$. Thus, as used herein, the term "linear" does not require the data of the linear obtainable travel distance $DTE_{LIN}$ to form a straight line when the data of the linear obtainable travel distance $DTE_{LIN}$ is plotted against time. Rather, as used herein, the term "linear" refers to a situation in which the data of the linear obtainable travel distance $DTE_{LIN}$ is more linear as compared to the data of the base obtainable travel distance $DTE_{BASE}$ when the data representing both values is plotted against time, as seen in FIG. 5.

Turning now to the calculation of the remaining fuel volume AFV that is used in the above mentioned equations (1) and (3). As mentioned above, the remaining fuel volume AFV is calculated based on the remaining fuel volume signal TANK_VOL from the fuel tank level sensor 22 and the fuel consumption signal TIM_VOL from the fuel consumption sensor 26. The remaining fuel volume AFV is calculated based on the prescribed calculation update time Tcal (e.g., thirty seconds). The remaining fuel volume AFV is calculated immediately before the baseline obtainable travel distance $DTE_{BASE}$ is calculated. In the illustrated embodiment, the calculated fuel volume AFV [L] is calculated using the following equation (4).

$$AFV[L] = PREV\_AFV - F\_VOL \qquad (4)$$

where:
   PREV_AFV [L]: Previous remaining fuel volume; and
   F_VOL [L]: Fuel volume used since the last AFV calculation.

In equation (4), the used fuel volume F_VOL is based on the remaining fuel volume signal TANK_VOL from the fuel tank level sensor 22 and the fuel consumption signal TIM_VOL from the fuel consumption sensor 26 to provide a more accurate value of the remaining fuel volume than if only a current tank level value from the fuel tank level sensor 22 was used, or if only a current fuel consumption value from the fuel consumption sensor 26 was used.

Preferably, the rough fuel volume in the fuel tank is calculated as a moving average based on the remaining fuel volume signal TANK_VOL from the fuel tank level sensor 22. The value of the remaining fuel volume signal TANK_VOL is calculated at the prescribed calculation update time Tcal. In the illustrated embodiment, rough remaining fuel tank volume values are calculated from the remaining fuel volume signal TANK_VOL using the following equation (5).

$$TANK\_VOL[L] = \frac{\sum_{i=1}^{N} F\_OUT(n-16)}{16} \qquad (5)$$

where:
   F_OUT(n−16): F_OUT value from previous 16 calculation update cycles; and
   F_OUT [L]: Average of fuel sender sampling since last calculation update time.

When the vehicle occupant information controller 14 is initialized by the vehicle ignition 20 being turned to the "ON" position to start the engine, all of the previously stored values for F_OUT are cleared. All values for F_OUT will then be set to the same value based directly on the current remaining fuel volume signal TANK_VOL from the fuel tank level sensor 22 at the time of engine start-up. Likewise, when a refueling situation has occurred, all values for F_OUT will then be set to the same value based directly on the current remaining fuel volume signal TANK_VOL from the fuel tank level sensor 22.

In equation (5) of the illustrated embodiment, the values for F_OUT are calculated using the following equation (6).

$$F\_OUT[L] = \frac{\sum_{i=1}^{N} FUEL\_SENDER(i)}{N} \qquad (6)$$

where:
   FUEL_SENDER [L]: Fuel volume measured by the fuel tank level sensor 22; and
   N: Number of values for the remaining fuel volume signal
   TANK_VOL recorded since last calculation update time Tcal.

On the other hand, the amount of fuel used based on the fuel consumption signal TIM_VOL is determined based on an accumulation of fuel used by the fuel injectors during the period (e.g., previous thirty seconds) since the previous calculation update time Tcal. In the illustrated embodiment, the amount of fuel used is calculated from the fuel consumption signal TIM_VOL using the following equation (7).

$$TIM\_VOL[L] = \frac{\sum DELTA\_TIM(i)}{10^6} \qquad (7)$$

where:
   DELTA_TIM [L]: Fuel measured by the fuel consumption sensor 26 since last calculation update time Tcal.

Figure 6:
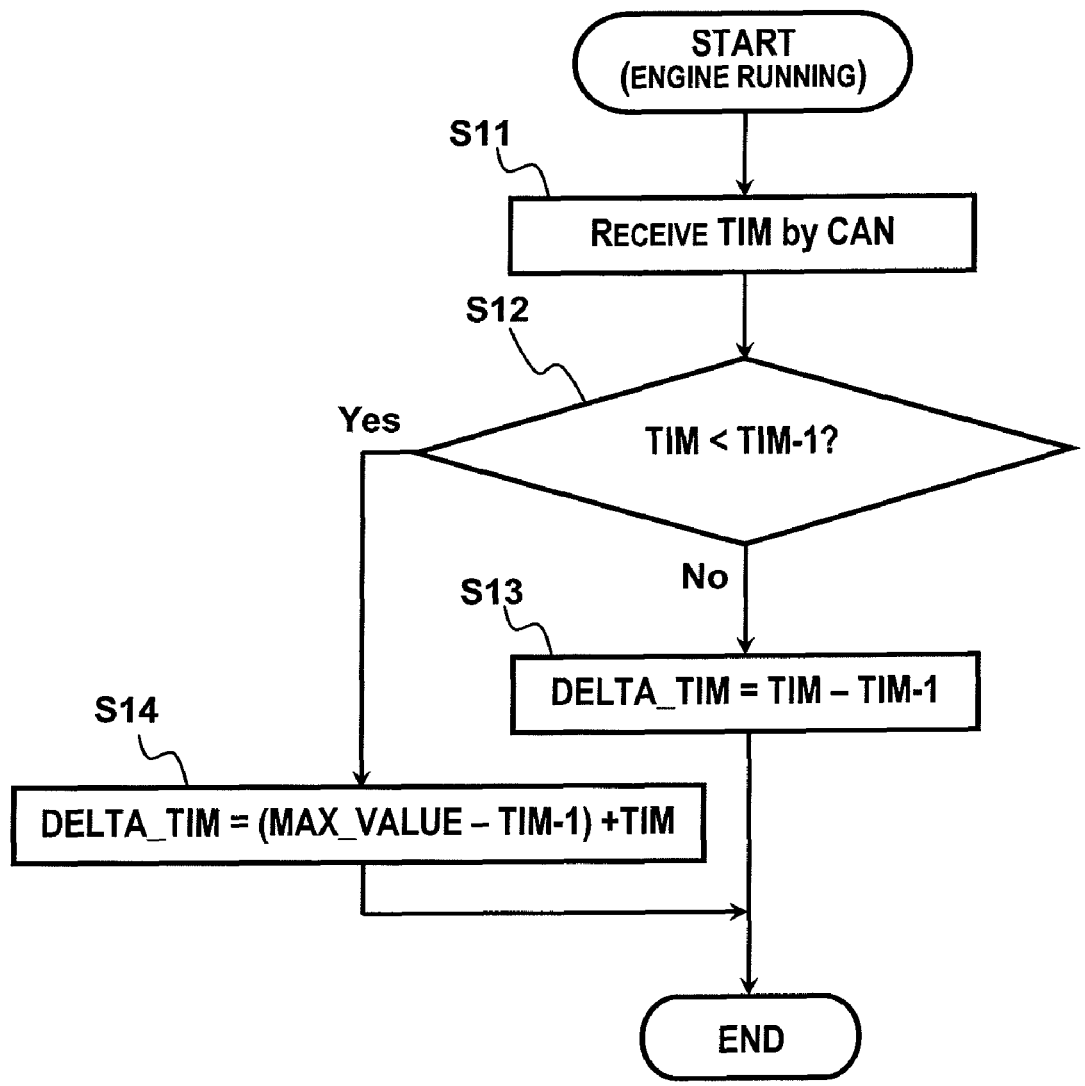
FIG. 6 is a flowchart illustrating a process executed by the vehicle occupant information controller to determine an amount of fuel used by fuel injectors since the last calculation update time.

Referring now to FIG. 6, the values for DELTA_TIM are set by the vehicle occupant information controller 14 while the engine is running. In particular, in the illustrated embodiment, in step S11, the vehicle occupant information controller 14 receives consumed fuel volume data TIM that is indicative of the fuel consumed by the fuel injectors per the injection period or cycle TS. The consumed fuel volume data TIM is received from the controller area network (CAN) at every injection cycle TS. Once the consumed fuel volume data TIM is received, in step S12, the current consumed fuel volume data TIM is compared to the previous consumed fuel volume TIM-1, wherein the previous consumed fuel volume TIM-1 is the immediately previous value of the fuel volume consumed by the fuel injectors in the immediately prior injection cycle TS. If the current consumed fuel volume TIM is greater than or equal to the previous consumed fuel volume TIM-1, then the process proceeds to step S13.

In step S13, the vehicle occupant information controller 14 sets the value of DELTA_TIM to the value TIM−TIM-1 when the current consumed fuel volume TIM is greater than or equal to the previous consumed fuel volume TIM-1. On the other hand, when the current consumed fuel volume TIM is less than the previous consumed fuel volume TIM-1, then the process proceeds to step S14. In step S14, the vehicle occupant information controller 14 sets the value of DELTA_TIM to the value of (MAX_VALUE−TIM-1)+TIM. The consumed fuel volume TIM data is reset to zero when the vehicle occupant information controller 14 is initialized by the vehicle ignition 20 being turned to the "ON" position to start the engine.

Figure 7:
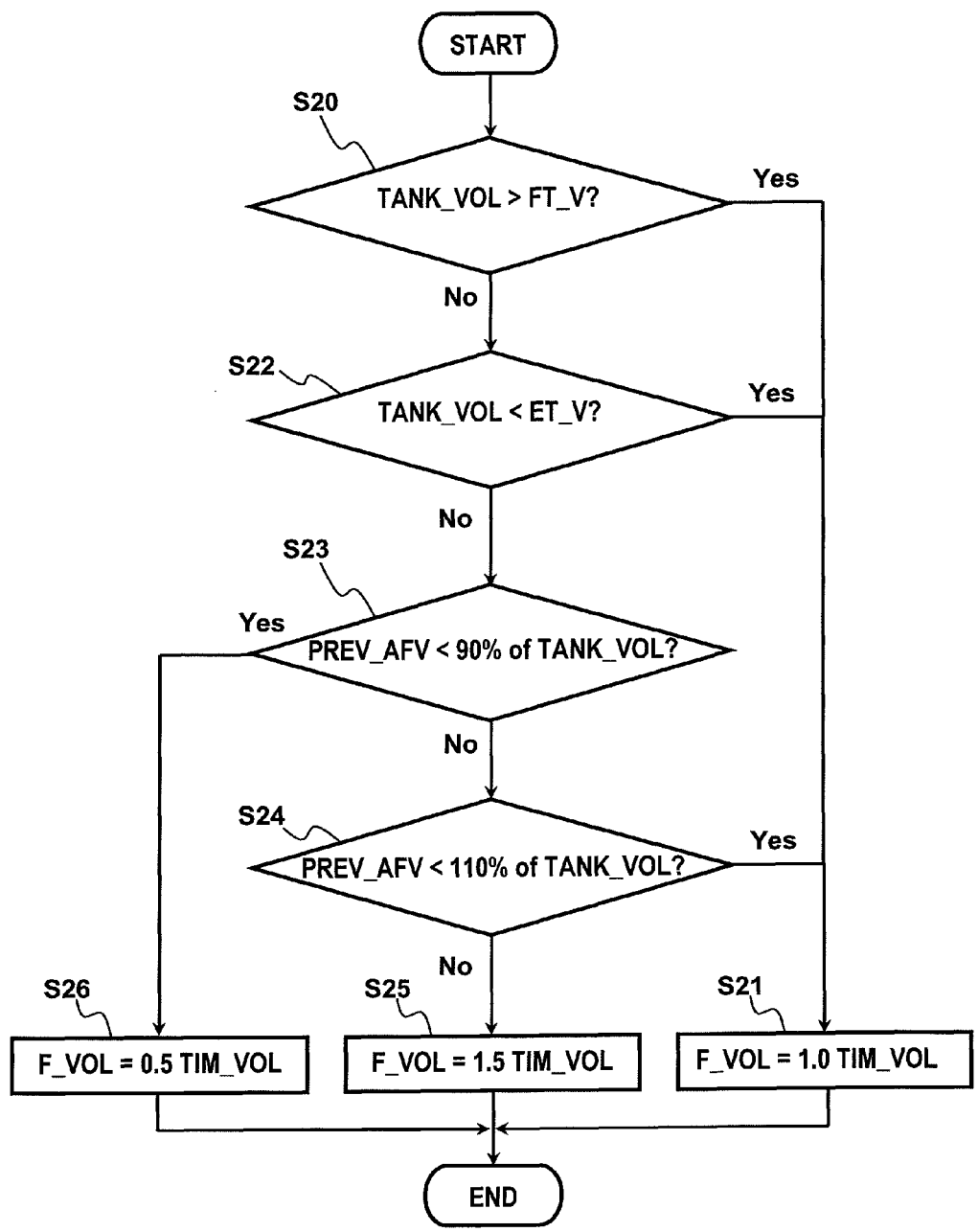
FIG. 7 is a flowchart illustrating a process executed by the vehicle occupant information controller to selectively adjust the volume of fuel used by the injection system for purposes of calculating a linear DTE value.

As seen in the flow chart of FIG. 7, the used fuel volume F_VOL is adjusted based on the relationship between the previous remaining fuel volume PREV_AFV and the current remaining fuel volume signal TANK_VOL so that the linear obtainable travel distance $DTE_{LIN}$ that is displayed on the user display 18 more closely changes proportionally to the remaining fuel volume displayed by the fuel gauge 22A on the vehicle's dashboard. The calculation of the used fuel volume F_VOL will now be discussed with reference to FIG. 7.

In step S20, the vehicle occupant information controller 14 determines if the fuel tank is full (i.e., above a prescribed fuel level). In the illustrated embodiment, the vehicle occupant information controller 14 determines if the amount of remaining fuel TANK_VOL in the fuel tank as measured by the fuel tank level sensor 22 is greater than a prescribed full tank volume FT_V of the fuel tank (i.e., TANK_VOL>FT_V). If the vehicle occupant information controller 14 determines the fuel tank is full (i.e., above the prescribed fuel level), then the process proceeds to step S21.

In step S21, the vehicle occupant information controller 14 sets the used fuel volume F_VOL equal to the value of the current fuel consumption signal TIM_VOL. However, if the vehicle occupant information controller 14 determines that the fuel tank is not full (i.e., not above the prescribed fuel level), then the process proceeds to step S22.

In step S22, the vehicle occupant information controller 14 determines if the fuel tank is empty (i.e., below a prescribed fuel level). In the illustrated embodiment, the vehicle occupant information controller 14 determines if the amount of remaining fuel TANK_VOL in the fuel tank as measured by the fuel tank level sensor 22 is less than a prescribed empty tank volume ET_V of the fuel tank (i.e., TANK_VOL<ET_V). If the vehicle occupant information controller 14 determines that the fuel tank is empty (i.e., below the prescribed fuel level), then the process proceeds to step S21, where the vehicle occupant information controller 14 sets the used fuel volume F_VOL equal to the value of the current fuel consumption signal TIM_VOL. However, if the vehicle occupant information controller 14 determines that the fuel tank is not empty (i.e., not below a prescribed fuel level), then the process proceeds to step S23.

In step S23, the vehicle occupant information controller 14 determines if the remaining fuel volume PREV_AFV from the last calculation is less than 90% of the amount of remaining fuel TANK_VOL in the fuel tank. If the vehicle occupant information controller 14 determines that the remaining fuel volume PREV_AFV is greater than or equal to 90% of the amount of remaining fuel TANK_VOL in the fuel tank, then the process proceeds to step S24.

In step S24, the vehicle occupant information controller 14 determines if the remaining fuel volume PREV_AFV is less than 110% of the amount of remaining fuel TANK_VOL in the fuel tank. If the remaining fuel volume PREV_AFV is less than 110% of the amount of remaining fuel TANK_VOL in the fuel tank, then the process proceeds to step S21, where the vehicle occupant information controller 14 sets the used fuel volume F_VOL equal to the value of the current fuel consumption signal TIM_VOL. However, if the vehicle occupant information controller 14 determines that the remaining fuel volume PREV_AFV is greater than or equal to 110% of the amount of remaining fuel TANK_VOL in the fuel tank, then the process proceeds to step S25.

In step S25, the vehicle occupant information controller 14 sets the used fuel volume F_VOL to 1.5 times the value of the current fuel consumption signal TIM_VOL. The value of the fuel consumption signal TIM_VOL is increased from the measured value by the fuel consumption sensor 26 because the amount of remaining fuel TANK_VOL in the fuel tank as measured by the fuel tank level sensor 22 has decreased such that the previously calculated remaining fuel volume PREV_AFV is no longer within a 10% margin of the amount of remaining fuel TANK_VOL. In other words, the fuel tank level sensor 22 is indicating a greater amount of fuel being used than the fuel consumption indicated by the fuel consumption sensor 26. Thus, the vehicle occupant information controller 14 increases the fuel consumption indicated by the fuel consumption sensor 26 in calculating the used fuel volume F_VOL to avoid a large proportional fluctuation between the remaining fuel volume displayed by the fuel gauge 22A and the linear obtainable travel distance $DTE_{LIN}$.

Turning back to step S23, if the remaining fuel volume PREV_AFV is less than 90% of the amount of remaining fuel TANK_VOL in the fuel tank, then the process proceeds to step S26. In step S26, the vehicle occupant information controller 14 sets the used fuel volume F_VOL to 0.5 times the value of the current fuel consumption signal TIM_VOL. The value of the fuel consumption signal TIM_VOL is decreased from the measured value by the fuel consumption sensor 26 because the amount of remaining fuel TANK_VOL in the fuel tank as measured by the fuel tank level sensor 22 has increased such that the previously calculated remaining fuel volume PREV_AFV is no longer within a 10% margin of the amount of remaining fuel TANK_VOL. In other words, the fuel tank level sensor 22 is indicating a smaller amount of fuel being used than the fuel consumption indicated by the fuel consumption sensor 26. Thus, the vehicle occupant information controller 14 decreases the fuel consumption indicated by the fuel consumption sensor 26 in calculating the used fuel volume F_VOL to avoid a large proportional fluctuation between the remaining fuel volume displayed by the fuel gauge 22A and the linear obtainable travel distance $DTE_{LIN}$.

In this prediction or estimate of fuel usage, the full tank volume (FT_V) and the empty tank volume (ET_V) should be separately determined for each vehicle model. In other words, the values for the full tank volume (FT_V) and the empty tank volume (ET_V) may vary depending on the vehicle model. Generally speaking, the full tank volume (FT_V) is set to a maximum capacity of the fuel tank that can be measured by the fuel tank level sensor 22 minus one liter. Also generally speaking, the empty tank volume (ET_V) is set to a minimum capacity of the fuel tank that can be measured by the fuel tank level sensor 22 plus one liter.

Figure 8:
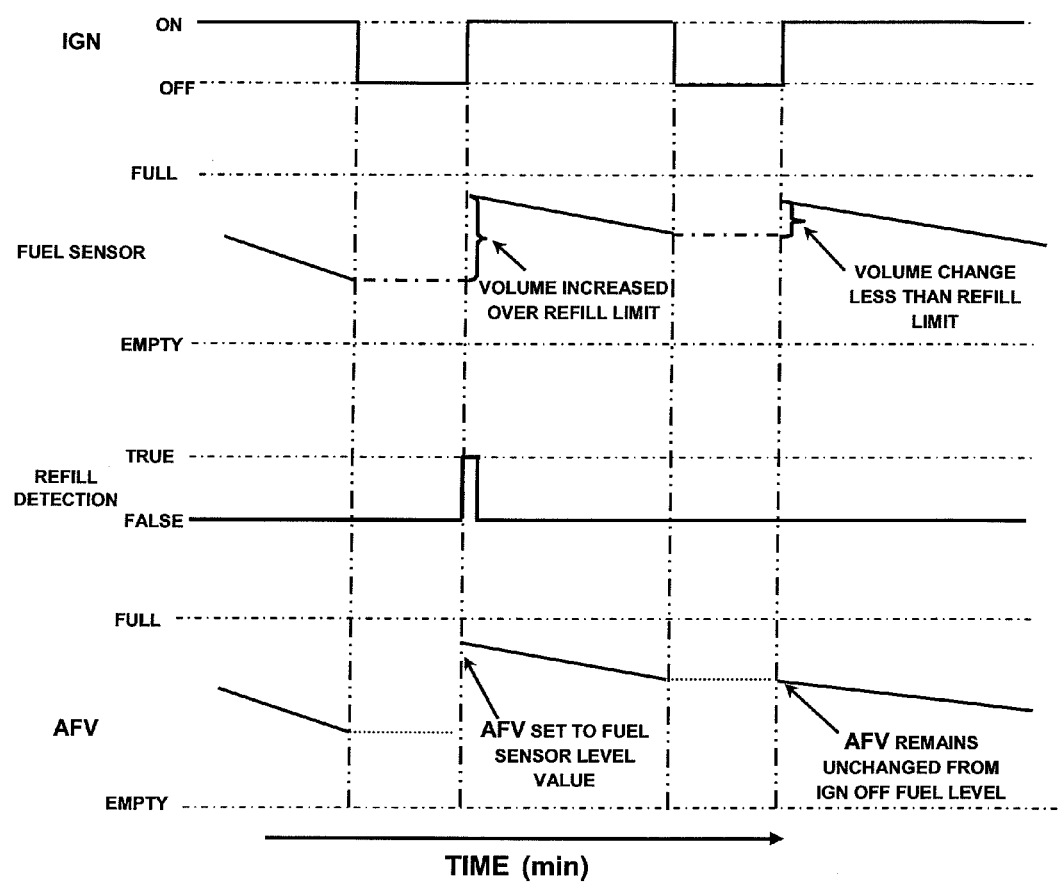
FIG. 8 is a timing chart illustrating situations involving the refueling of the fuel tank in which the ignition is turned off and on again.
Figure 9:
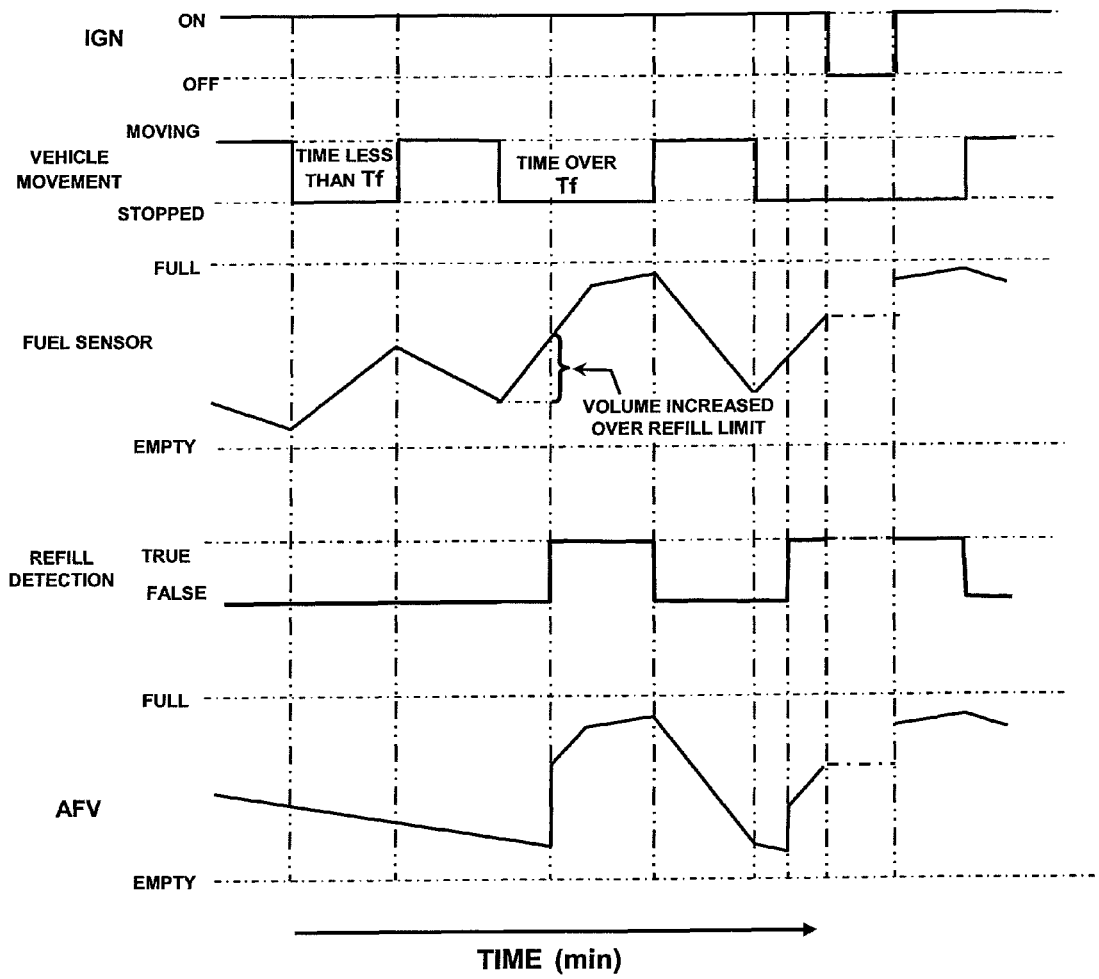
FIG. 9 is a timing chart illustrating situations involving the refueling of the fuel tank in which the ignition remains "ON"

Referring now to FIGS. 8 and 9, situations involving the refueling of the fuel tank will be discussed. The remaining fuel volume AFV is preferably updated upon refueling. If refueling is detected by the vehicle occupant information controller 14 using the fuel tank level sensor 22, the remaining fuel volume AFV is updated regardless of the amount of time that has passed since an immediately previous update. Normal refueling as used herein refers to a volume increase of the fuel in the fuel tank above a prescribed refill limit while the vehicle ignition 20 is "OFF". Fast-fill refueling as used herein refers to a volume increase of the fuel in the fuel tank above a prescribed refill limit while the vehicle ignition 20 is "ON".

As seen in FIG. 8, when the vehicle ignition 20 is switched from an "OFF" position to an "ON" position, the vehicle occupant information controller 14 compares previously stored fuel level sensor data measured by the fuel tank level sensor 22 to current fuel level sensor data measured by the fuel tank level sensor 22. If the current fuel level sensor data reveals a volume increase of a prescribed refill limit or more, then the vehicle occupant information controller 14 determines that normal refueling has occurred. If the vehicle occupant information controller 14 determines that normal refueling has occurred, then the remaining fuel volume AFV will be set to follow the fuel sensor data of the fuel tank level sensor 22 and will be updated immediately. Also if the vehicle occupant information controller 14 determines that normal refueling has occurred, then any history used for fuel tank level will be removed and replaced with current data.

As seen in FIG. 9, when the vehicle 10 has stopped (i.e. vehicle speed is zero) for a prescribed minimum time Tf or more with the vehicle ignition 20 in the "ON" position and the fuel tank level sensor 22 detects a volume increase of a prescribed refill limit or more, then fast-fill refueling is determined to have occurred. The vehicle occupant information controller 14 determines that the fast-fill refueling situation has ceased when the vehicle 10 moves again (i.e. vehicle speed is greater than zero). Following a fast-fill refueling situation, the remaining fuel volume AFV is set to follow the fuel sensor data of the fuel tank level sensor 22 and is updated immediately. When the vehicle occupant information controller 14 determines that the fast-fill refueling situation has ceased, normal operation resumes with any history used for fuel tank level being removed and replaced with the current data.

Figure 10:
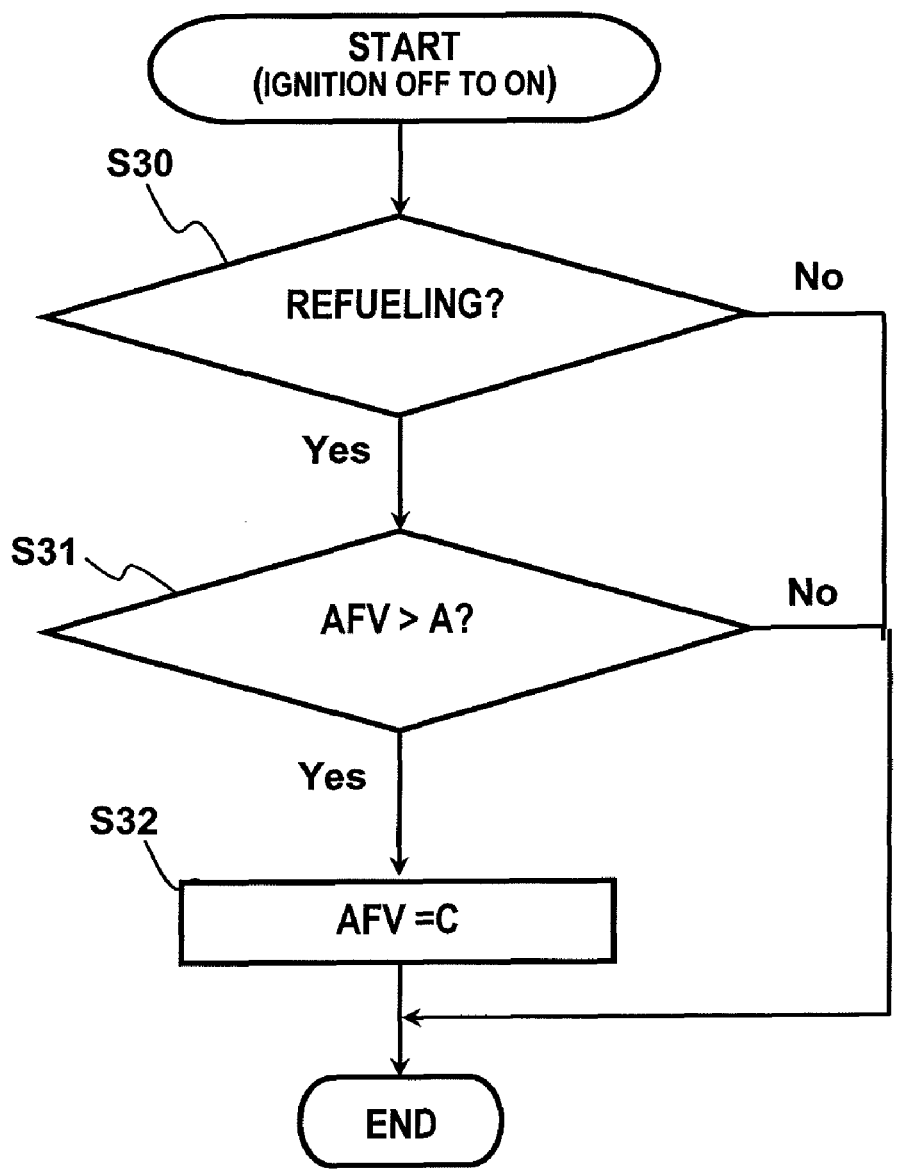
FIG. 10 is a flowchart illustrating a process executed by the vehicle occupant information controller to set the remaining fuel volume AFV in an overfilling situation.

Overfilling of the fuel tank sometimes occurs when the amount of remaining fuel exceeds that measurable by the fuel tank level sensor 22. The vehicle occupant information controller 14 detects over-fueling using the process shown in FIG. 10. As seen in FIG. 10, this process is executed each time power is sent to the vehicle occupant information controller 14 (e.g., the vehicle ignition 20 is switched from the "OFF" position to the "ON" position). Once the vehicle occupant information controller 14 is activated, in step S30, the vehicle occupant information controller 14 determines if the fuel tank has been refilled (i.e., the amount of remaining fuel TANK_VOL in the fuel tank has increased over a prescribed refill limit). If the vehicle occupant information controller 14 determines that the fuel tank has not been refilled, then the process ends. However, if the vehicle occupant information controller 14 determines that the fuel tank has been refilled, then the process proceeds to step S31.

In step S31, the vehicle occupant information controller 14 determines if the remaining fuel volume AFV is greater than the maximum measurable remaining fuel amount A. If the vehicle occupant information controller 14 determines that the remaining fuel volume AFV is less than or equal to the maximum measurable remaining fuel amount A, then the process ends. However, if the vehicle occupant information controller 14 determines that the fuel tank has been overfilled, then the process proceeds to step S32.

In an overfilling situation, a person fills their fuel tank such that the fuel level rises above the measurable volume of the fuel tank by the fuel tank level sensor 22. For example, there may be a point at which the float of the fuel tank level sensor 22 hits the top of the fuel tank when in actuality more fuel can still be added. In other words, there is a difference between the amount of fuel that can be measured by the fuel tank level sensor 22 and the amount of fuel that can fit into the fuel tank. In the event of an overfilling situation, an estimate needs to be made as to what the actual volume is in the fuel tank due to the overfilling. Thus, in step S32, the vehicle occupant information controller 14 sets the remaining fuel volume AFV to an average remaining fuel amount C, which is an arbitrary preset value. For example, the average remaining fuel amount C can be set to the sum of the maximum measurable fuel amount A by the fuel tank level sensor 22 and the maximum fuel capacity amount B of the fuel tank divided in half (i.e., C=(A+B)/2). In any event, prior to a refueling event, the base obtainable travel distance $DTE_{BASE}$ is able to both increase and decrease and the linear obtainable travel distance $DTE_{LIN}$ is only able to decrease.

Now the calculation of the fuel consumption (economy) rate AFC will be discussed. The fuel consumption rate AFC is calculated periodically based on a fuel economy update distance Dcal (e.g., 1.0 km). The fuel consumption rate AFC is a weighted moving average over the previous 1 km of travel. More recent data is weighted more heavily in calculating the fuel consumption rate AFC. In the illustrated embodiment, the average fuel consumption rate AFC is calculated using the following equation (8).

$$AFC\ [L/100\ km] = PREV\_AFC + (F\_ECON - PREV\_AFC) \times ECON_{ADJ} \quad (8)$$

where:
F_ECON [L/100 km]: Fuel economy value for previous 1 km of travel;
PREV_AFC [L/100 km]: Previous fuel consumption rate; and
$ECON_{ADJ}$: Fuel economy adjustment factor based on vehicle stoppage.

In the illustrated embodiment, the fuel economy value F_ECON is calculated using the following equation (9).

$$F\_ECON[L/100\ km] = \frac{TIM\_ECON}{ECON\_DIST} \times 100 \quad (9)$$

where:
TIM_ECON [L]: Cumulative amount of fuel consumed by fuel injectors since last FUEL ECON calculation; and
ECON_DIST [km]: Cumulative distance traveled since last
F_ECON calculation based on CAN message for vehicle speed.

However, the change of the fuel economy value F_ECON is limited to a prescribed limiter value L_AFC (e.g., 2.5 L/100 km to 80 L/100 km) to reduce fluctuations from a prior fuel economy value F_ECON. Thus, if the current fuel economy value F_ECON determined from equation (9) is greater than the last calculation of the fuel economy value F_ECON by the prescribed limiter value L_AFC or more, then the current fuel economy value F_ECON is reset such that it only increases by an amount equal to the prescribed limiter value L_AFC.

In the illustrated embodiment, the fuel used value TIM_ECON is calculated using the following equation (10).

$$TIM\_ECON[L] = \frac{\sum DELTA\_TIM(i)}{10^6} \quad (10)$$

where:
DELTA_TIM [L]: Fuel measured by fuel injectors since the last calculation update time.

The fuel economy adjustment factor $ECON_{ADJ}$ will take into account the fuel that is consumed when the vehicle is running, but not moving. In the illustrated embodiment, the fuel economy adjustment factor $ECON_{ADJ}$ is calculated using the following equation (11).

$$ECON_{ADJ} = \frac{P\_TIMER}{TIMER} \times 90 \quad (11)$$

where:
P_TIMER [ms]: Amount of volume consumed in which the vehicle is not in park and the parking brake switch is off based on the CAN message data since the last AFC calculation; and TIMER [ms]: Total amount of fuel consumed since the last AFC calculation.

Figure 11:
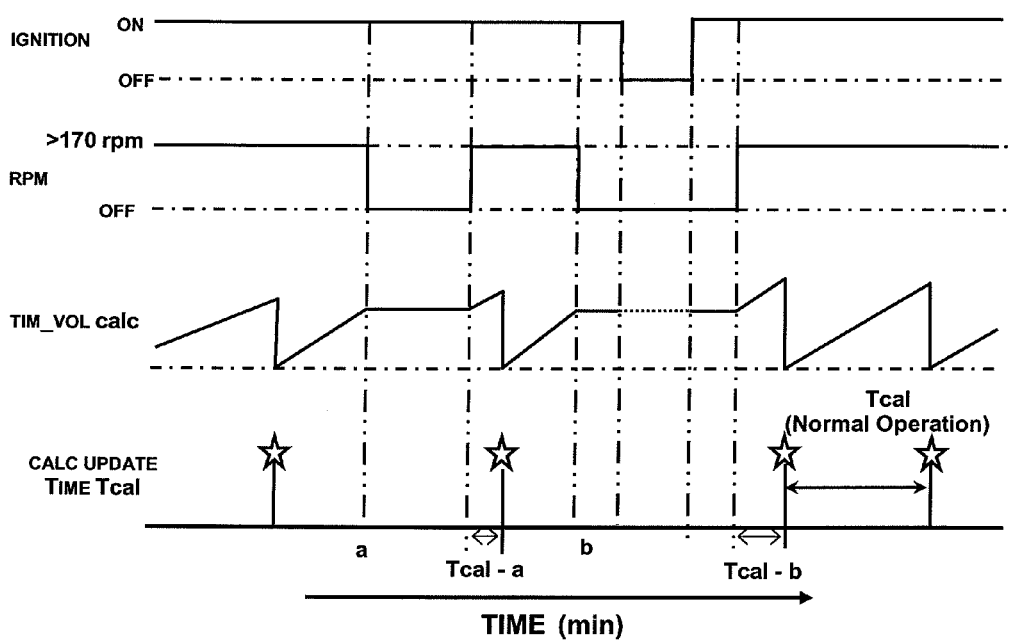
FIG. 11 is a timing chart illustrating an updating process for the fuel consumption signal TIM_VOL.

As seen in FIG. 11, a timing chart is illustrated in which the prescribed calculation update time Tcal is set to thirty seconds such that the remaining fuel volume AFV, the fuel consumption rate AFC, the baseline obtainable travel distance $DTE_{BASE}$ and the linear obtainable travel distance $DTE_{LIN}$ are calculated every thirty seconds while the engine of the vehicle 10 is running. The Tcal timer continues to run so long as the engine is running (e.g., greater than 170 rpm). If the engine stops running (e.g., less than or equal to 170 rpm), the current value of the Tcal timer is saved and the Tcal timer resumes once the engine begins to run (e.g., greater than 170 rpm) again. Whenever the vehicle ignition 20 is turned to the "ON" position and normal refueling is detected, the data values tracked by the vehicle occupant information controller 14 are updated. After updating the data, normal operation according to the prescribed calculation update time Tcal resumes. Also, if a fast-fill situation is detected after the vehicle ignition 20 is turned to the "ON" position, the vehicle occupant information controller 14 proceeds normally according to the prescribed calculation update time Tcal.

In the illustrated embodiment, different obtainable travel distance values DTE are optionally set based on the geographical region in which the vehicle is being used. However, the linear obtainable travel distance $DTE_{LIN}$ could be used in all geographical regions if needed and/or desired. As mentioned above, the linear obtainable travel distance $DTE_{LIN}$ is programmed to act linearly and only decrease while the vehicle 10 is in use and not refueled in order to reduce driver confusion. In any event, the vehicle occupant information system 12 can be set to act linearly in some markets where this meets customer expectations, and allowed to both increase and decrease in other markets where this is not a significant concern.

Additionally, as mentioned above, even when the vehicle 10 is programmed to display a linear DTE value, the algorithm periodically compares the linear DTE value to a baseline DTE value in order to ensure that the difference between the two values does not exceed a predetermined value. If the difference exceeds the predetermined value, an adjustment factor $DTE_{ADJ}$ is used to prevent the linear DTE value from straying too far from the baseline DTE value. In other words, the linear obtainable travel distance $DTE_{LIN}$ is based on a difference between a previous obtainable travel distance value corresponding to the first location and the adjusted vehicle traveled distance value DTE_DIST. As mentioned above, the adjusted vehicle traveled distance value DTE_DIST is equal to a product of the vehicle traveled distance since the last calculation and a distance adjustment factor $DTE_{ADJ}$, with the distance adjustment factor $DTE_{ADJ}$ being selectively adjusted based on a ratio of the linear obtainable travel distance $DTE_{LIN}$ to the base obtainable travel distance $DTE_{BASE}$.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle occupant information controller comprising:
a fuel volume determining section that determines a remaining fuel volume;
a fuel economy determining section that determines a fuel consumption rate;
a first distance determining section that determines a first obtainable travel distance based on the remaining fuel volume and the fuel consumption rate;
a traveled distance determining section that determines a vehicle traveled distance from a first location to a second subsequent location; and
a second distance determining section that determines a second obtainable travel distance based on a difference between a previous obtainable travel distance value corresponding to the first location and an adjusted vehicle traveled distance value, with the adjusted vehicle traveled distance value being equal to a product of the vehicle traveled distance and a distance adjustment factor that is selectively adjusted based on a ratio of the second obtainable travel distance to the first obtainable travel distance.

2. The vehicle occupant information controller according to claim 1, further comprising
a selection section that receives both the first obtainable travel distance and the second obtainable travel distance and that selectively outputs one of the first obtainable travel distance and the second obtainable travel distance based on an operating mode of the vehicle occupant information controller.

3. The vehicle occupant information controller according to claim 1, wherein
the second distance determining section decreases the adjusted vehicle traveled distance value when the ratio of the second obtainable travel distance to the first obtainable travel distance is less than a predetermined value.

4. The vehicle occupant information controller according to claim 1, wherein
the second distance determining section increases the adjusted vehicle traveled distance value when the ratio of the second obtainable travel distance to the first obtainable travel distance exceeds a predetermined value.

5. The vehicle occupant information controller according to claim 2, wherein
the operating mode of the vehicle occupant information controller is based on a geographical location of the vehicle.

6. The vehicle occupant information controller according to claim 2, further comprising
a user interface including an operating mode selection feature to manually select the operating mode of the occupant information controller.

7. The vehicle occupant information controller according to claim 1, wherein
the traveled distance determining section determines the vehicle traveled distance value based on a change in the remaining fuel volume and the fuel consumption rate.

8. A vehicle occupant information system comprising:
a fuel sensor that detects a remaining fuel volume and generates a remaining fuel volume signal indicative of the remaining fuel volume;
a speed sensor that detects a vehicle speed and generates a vehicle speed signal indicative of the vehicle speed;
an information controller that receives the remaining fuel volume signal and the speed signal, the information controller determines
a fuel consumption rate based on values of the remaining fuel volume signal and the vehicle speed signal,
a first obtainable travel distance based on the value of the remaining fuel volume signal and a value of the fuel consumption rate,
a vehicle traveled distance from a first location to a second subsequent location, and
a second obtainable travel distance based on a difference between a previous obtainable travel distance value corresponding to the first location and an adjusted vehicle traveled distance value, with the adjusted vehicle traveled distance value being equal to a product of the vehicle traveled distance and a distance adjustment factor that is selectively adjusted based on a ratio of the second obtainable travel distance to the first obtainable travel distance.

9. The vehicle occupant information system according to claim 8, further comprising
a vehicle ignition operatively connected to the information controller, with the vehicle ignition enabling operation of the information controller.

10. The vehicle occupant information system according to claim 8, further comprising
a user display operatively connected to the information controller, with the information controller selectively outputting one of the first obtainable travel distance and the second obtainable travel distance based on an operating mode of the information controller.

11. The vehicle occupant information system according to claim 10, further comprising
a user interface operatively connected to the information controller, with the user interface including an operating mode selection feature to manually select the operating mode of the information controller.

12. The vehicle occupant information system according to claim 8, further comprising
a fuel consumption sensor that detects a consumed fuel volume and generates a fuel consumption signal indicative of the consumed fuel volume.

13. The vehicle occupant information system according to claim 12, wherein
the information controller determines a secondary remaining fuel volume based on a value of the fuel consumption signal, after initial detection of the remaining fuel volume by the fuel sensor.

14. The vehicle occupant information system according to claim 8, wherein
the information controller decreases the traveled distance when the ratio of the second obtainable travel distance to the first obtainable travel distance is less than a predetermined value.

15. The vehicle occupant information system according to claim 8, wherein
the information controller increases the traveled distance when the ratio of the second obtainable travel distance to the first obtainable travel distance exceeds a predetermined value.

16. The vehicle occupant information system according to claim 10, wherein
the operating mode of the occupant information system is based on a geographical location of the vehicle.

17. The vehicle occupant information system according to claim 8, wherein
the vehicle traveled distance is determined based on a change in the remaining fuel volume and the fuel consumption rate.

18. A method for operating a vehicle information system comprising:
operating a controller to determine a fuel consumption rate based on a remaining fuel volume and a rate of travel;
operating the controller to determine a first obtainable travel distance based on the remaining fuel volume and the fuel consumption rate;
operating the controller to determine vehicle traveled distance from a first location to a second subsequent location; and
operating the controller to determine a second obtainable travel distance based on a difference between a previous obtainable travel distance value corresponding to the first location and an adjusted vehicle traveled distance value, with the adjusted vehicle traveled distance value being equal to a product of the vehicle traveled distance and a distance adjustment factor that is selectively adjusted based on a ratio of the second obtainable travel distance to the first obtainable travel distance.

19. The method according to claim 18, wherein
the vehicle traveled distance is determined based on a change in the remaining fuel volume and the fuel consumption rate.

* * * * *